United States Patent [19]

Cornett et al.

[11] Patent Number: 4,845,500

[45] Date of Patent: Jul. 4, 1989

[54] RADAR VIDEO DETECTOR AND TARGET TRACKER

[75] Inventors: Johnny A. Cornett, Crozet; James D. Corbett, Charlottesville, both of Va.

[73] Assignee: Sperry Marine Inc., Charlottes, Va.

[21] Appl. No.: 173,399

[22] Filed: Mar. 25, 1988

[51] Int. Cl.⁴ .......................... G01S 13/06; G01S 13/42
[52] U.S. Cl. ........................................ 342/90; 342/139
[58] Field of Search .................... 342/90, 91, 136, 139

[56] References Cited

U.S. PATENT DOCUMENTS

| | | |
|---|---|---|
| 3,412,397 | 11/1968 | Evans . |
| 3,878,530 | 4/1975 | Wilmot . |
| 3,887,917 | 6/1975 | Howard et al. . |
| 4,062,012 | 12/1977 | Colbert et al. . |
| 4,214,239 | 7/1980 | Dillard . |
| 4,386,353 | 5/1983 | Bleijerveld et al. . |
| 4,527,159 | 7/1985 | Bergman . |
| 4,665,402 | 5/1987 | Young . |

*Primary Examiner*—Thomas H. Tarcza
*Assistant Examiner*—Mark Hellner
*Attorney, Agent, or Firm*—Seymour Levine

[57] ABSTRACT

A system for detecting and tracking a multiplicity of targets averages radar video returns over small sectors for data smoothing and noise reduction, provides adaptive thresholding by determining noise levels in an area of interest and establishes a detection threshold in accordance with such noise level, stores the video data for reach target of interest so that multiple targets on the same bearing may be tracked, and reduces the probability of target swapping by adjusting the target window in accordance with target size and weighting the cells within the window.

10 Claims, 4 Drawing Sheets

RADAR VIDEO DETECTOR AND TARGET TRACKER

BACKGROUND OF THE INVENTION

1. Field of the Invention

The invention relates generally to the art of processing radar video signals, and more particularly to simultaneously processing video signals from multiple target returns using adaptive threshold settings.

2. Description of the Prior Art

Detection systems for separating targets from noise have been proposed in which the detection threshold is either fixed or automatically adjusted in accordance with variations in background noise and interference. One such prior art system is described in U.S. Pat. No. 4,005,416 issued Jan. 25, 1977 and assigned to the assignee of the present invention. The detection system proposed therein is automatically adjusted in accordance with variations in background noise and interference. The energy levels of video signals within each of three successive range cells are coupled to a comparator wherein the energy contained within a central range cell is compared with the energy contents within the two adjacent range cells. A target indication in a range cell is provided when the ratios of energy in that range cell to the energy in each of the two adjacent cells are both greater than a predetermined value. Noise and interference responses are minimized by summing the output signals of the comparator over a number of range sweeps. A target indication is provided when the sum achieves a specified number before a predetermined number of range sweeps have been completed. The existence of a target requires that both detection criteria be satisfied. This system requires continuous energy comparisons and redundant processing before an existing target is reported. Additionally, the system does not achieve noise reduction in the target area. Targets are reported when the energy in a range cell is greater than the energy in the two adjacent range cells. Thus, the detection threshold rides on the background noise. True noise reduction is not achieved. Further, this detection system does not provide for processing more than one target within a bearing sector.

In a prior art tracking system, disclosed in U.S. Pat. No. 4,070,673, computer generated digital signals representative of leading and trailing edges of range and azimuth intervals defining a tracking window are compared with the instantaneous range and antenna position to provide pulses signifying the opening and closing of a tracking window. This control unit provides signals to a multiplicity of counting circuits wherein the number of pulse transmissions, range bins traversed, and radar target returns within the defined tracking windows are established. The pulse transmission and range bin counters are coupled to accumulators which are enabled by pulses from a comparator, provided when the radar video returns within the tracking window exceed a fixed signal threshold. When the accumulator associated with the pulse transmission counter is enabled, the transmission count, corresponding to the enabling radar return, is added to the total in the accumulator to achieve a weighted sum of angular returns. In a like manner, a radar return enables the accumulator associated with the range bin counter to add the range bin count, associated with the radar return, to the total in the range accumulator. These weighted sums and the radar target return count are utilized to determine the range and angle centroids of a target. Though this system provides accurate tracking of a detected target, it operates at a fixed detection threshold, requiring M of N processing to reduce the probability of false alarms. Further, the system does not have the capability of processing multiple targets on a given bearing.

Other prior art detection and tracking systems use either fixed thresholds for separating targets from noise or sequential methods which establish a predetermined detection or noise threshold and then increment or decrement the threshold in accordance with the observed target magnitudes, and noise and interference levels. Such systems provide less than optimum thresholds in a single scan, or require a multiplicity of scans to achieve an optimum threshold. Further, such prior art systems are incapable of tracking multiple targets on a bearing. Since data for only one target on a bearing can be processed on a single scan, multiple scans are required to update target information for multiple targets on a bearing. Moreover, the prior art systems are subject to switching from tracking one target to tracking a second target (target swapping) if the second target is in the vicinity of the first and its radar return exceeds that of the first.

SUMMARY OF THE INVENTION

The present invention processes radar video to reduce noise effects, provides variable thresholds in accordance with background noise and clutter, profides for multiple target tracking, and prevents target swapping. To enhance the radar video signals, the video of repetitive range sweeps is averaged over small sectors, to reduce the effort of noise and enhance signal amplitude. An adaptive detection threshold is provided by measuring the background noise in the vicinity of the target and computing a mean and mean deviation of the noise. This value is calculated for each target on every scan, so that the threshold computed is precise and adapts dynamically to changing conditions. Tracking multiple targets on a given bearing is accomplished by storing the video data so that the data may be subsequently processed as readily as targets on differing bearings. Finally, target swapping is reduced by a combination of adjusting the window size (a plurality of sectors) in accordance with the size of the target being tracked, and weighting the sectors so that the sectors at the edges of the window do not affect the calculations of target position as much as the central sectors.

Radar video signals from a target or clutter are averaged within small areas (cells) and stored in a memory for processing. These cells are elements in a matrix formed by n aximuth sectors and m range bins within present a target window, the window containing m X n cells. Stored values in the first and last rows of cells in the window are processed to establish the mean value and mean deviation value for each row. The mean and mean deviation values in the row have the smaller mean and mean deviation values are chosen for further processing. A linear combination of the chosen mean and mean deviation values is subtracted from each averaged signals to establish a new stored amplitude for each cell with significantly reduced background noise and clutter.

Each sector element is then compared with its neighboring elements, and a detection is indicated in a cell when at least one of the two adjacent elements have positive resulting amplitudes. The number of detections and their position within the window is then used to adjust the window size. A center of gravity computation is then performed to center the target within the adjusted window.

Target position is determined on successive antenna scans. From the difference in positions and the elapsed time interval between scans, an initial target speed and heading is computed. A recursive filter receives the computed target speed and heading as an initial value, and calculates a new estimated position. Each calculated position is compared with the estimated position from the previous scan to determine an estimated error, which is then used to establish the next estimated position. The error is quickly minimized and accurate tracking is accomplished.

DESCRIPTION OF THE PREFERRED EMBODIMENT

Figure 1:
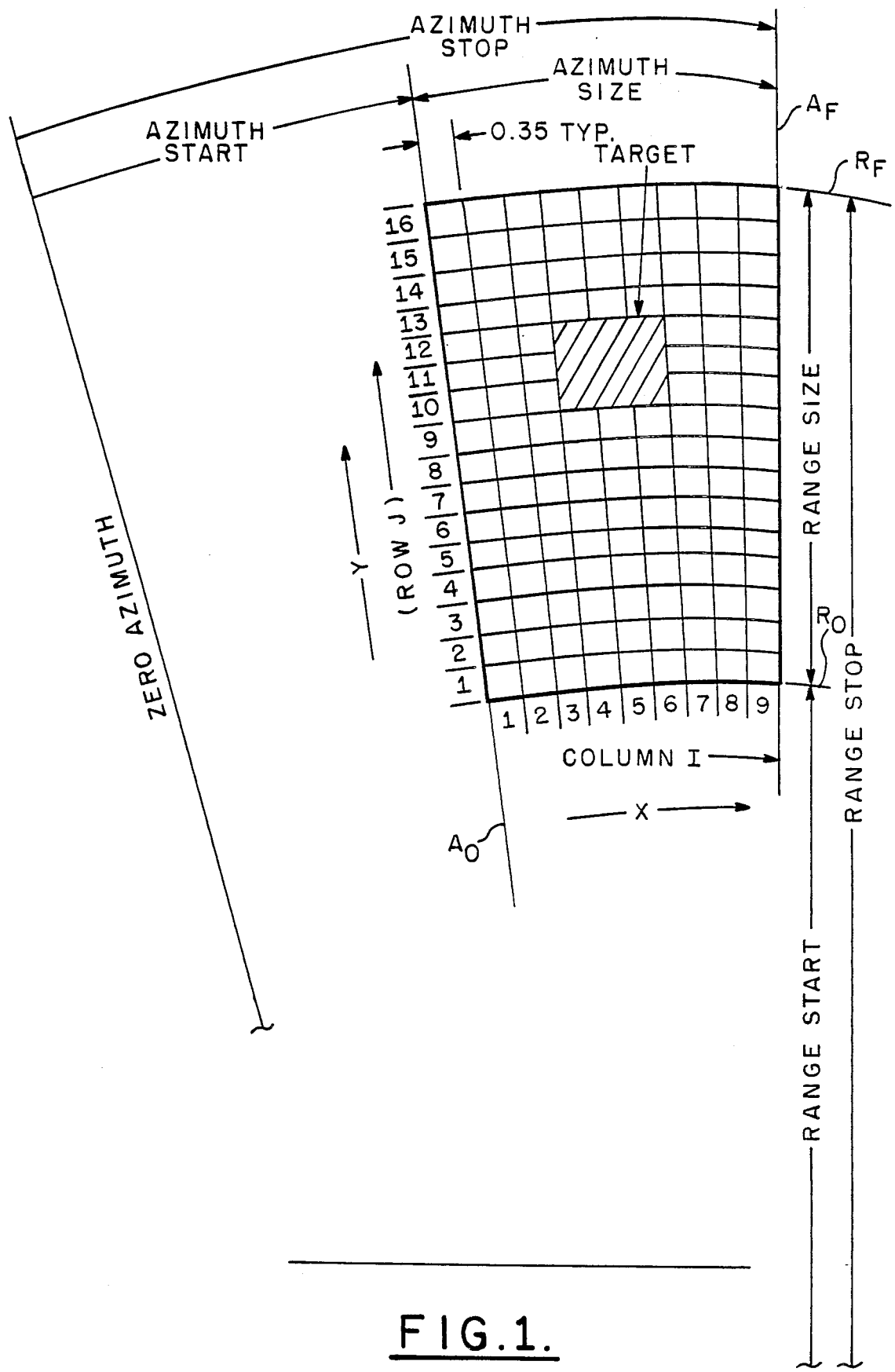
FIG. 1 is a representation of a target window.

A target window within which a target is to be tracked is represented in FIG. 1. An azimuth size for this window may comprise nine (9) azimuth sectors commencing at an azimuth $A_s$ and terminating at an azimuth $A_t$, each of which may be 0.35 degrees, while a range size, commencing at a range start $R_s$ and terminating at a range stop $R_t$, may comprise sixteen (16) equal range bins. The number of azimuth sectors and range bins may be adjusted in accordance with a desired range size. The arrangement shown forms an array of $9 \times 16$ cells, each of which covers an area that is smaller than the anticipated physical size of the target so that the target will be detected in more than one cell. While an array of 9 columns $\times$ 16 rows with an azimuth sector of 0.35 degrees is shown, this is to be considered exemplary and not limiting. The actual window size is varied in accordance with the size of the target, as will be described subsequently.

An antenna scan rate for the system may be typically 22 rpm while the pulse repetition may be chosen to provide 640 Hz, 1600 Hz, or 3200 Hz. Thus, for these values the number of pulses that may be emitted within each azimuth sector may vary between and one (1) and nine (9).

Figure 2:
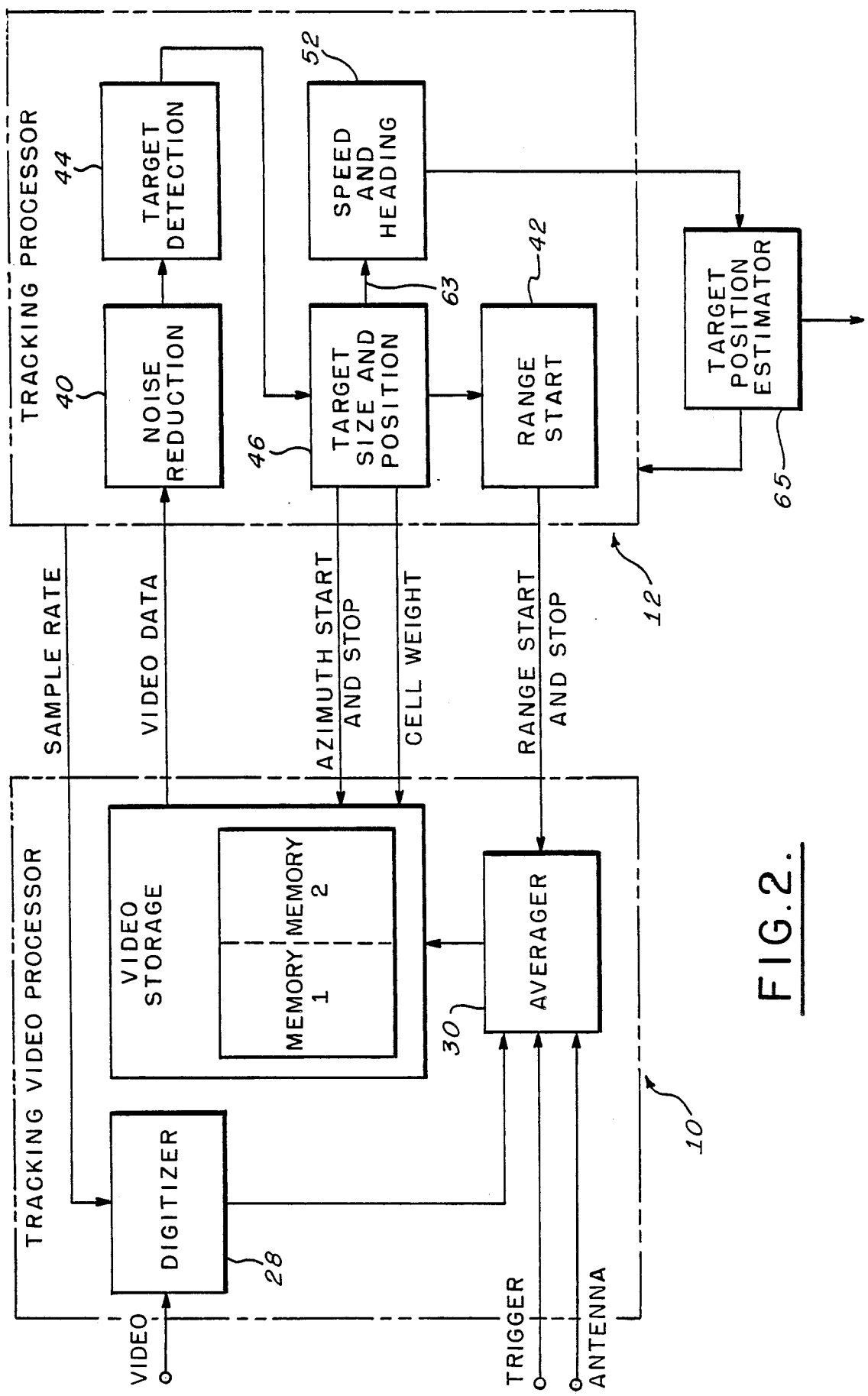
FIG. 2 is a block diagram of the target detection and processing circuitry of the present invention.

Refer now to FIG. 2 with continued reference to FIG. 1. Analog video signals on line 22 representative of radar returns from a target are applied to a digitizer 28 of a tracking video processor 10. Radar trigger pulses on line 24, antenna scan pulses on line 26, representative of the azimuth rotation of an antenna not shown, and range start pulses on line 36 provided by tracking processor 12, are coupled to an averager 30 in tracking video processor 10. Tracking processor 12 determines the size of the target and adjusts the window size in accordance therewith. A target position estimator 65, in tracking processor 12, computes the range and bearing of the target and provides an estimated range and bearing at a desired future time.

The video data is encoded into digital words, at a sampling rate established by a sampling rate signal on line 38 coupled from tracking processor 12, and the digitized video data, corresponding to each cell position, is averaged over the number of consecutive radar pulses within the azimuth sector. The number of these pulses being a function of the repetition rate. Each trigger pulse denotes the start of a video data cycle. The averager 30 sums the signal amplitudes in digital form for each cell and divides the accumulated values by the number of trigger pulses within an azimuth sector on line 24 to establish an average video value for each cell.

Averaged video data for each cell is stored in video storage memory 32 comprising two memory units, wherein each storage element in each unit represents a cell of a window. While the first memory unit is accepting averaged data over a set of range starts in an azimuth size, the second memory unit transfers the averaged data stored therein, obtained over the previous azimuth size, to the tracking processor 12 for further processing and target tracking, yet to be described. As presently configured, the system stores and processes data for up to eight targets on a bearing and up to twenty targets for all bearings during an antenna scan.

Figure 3:
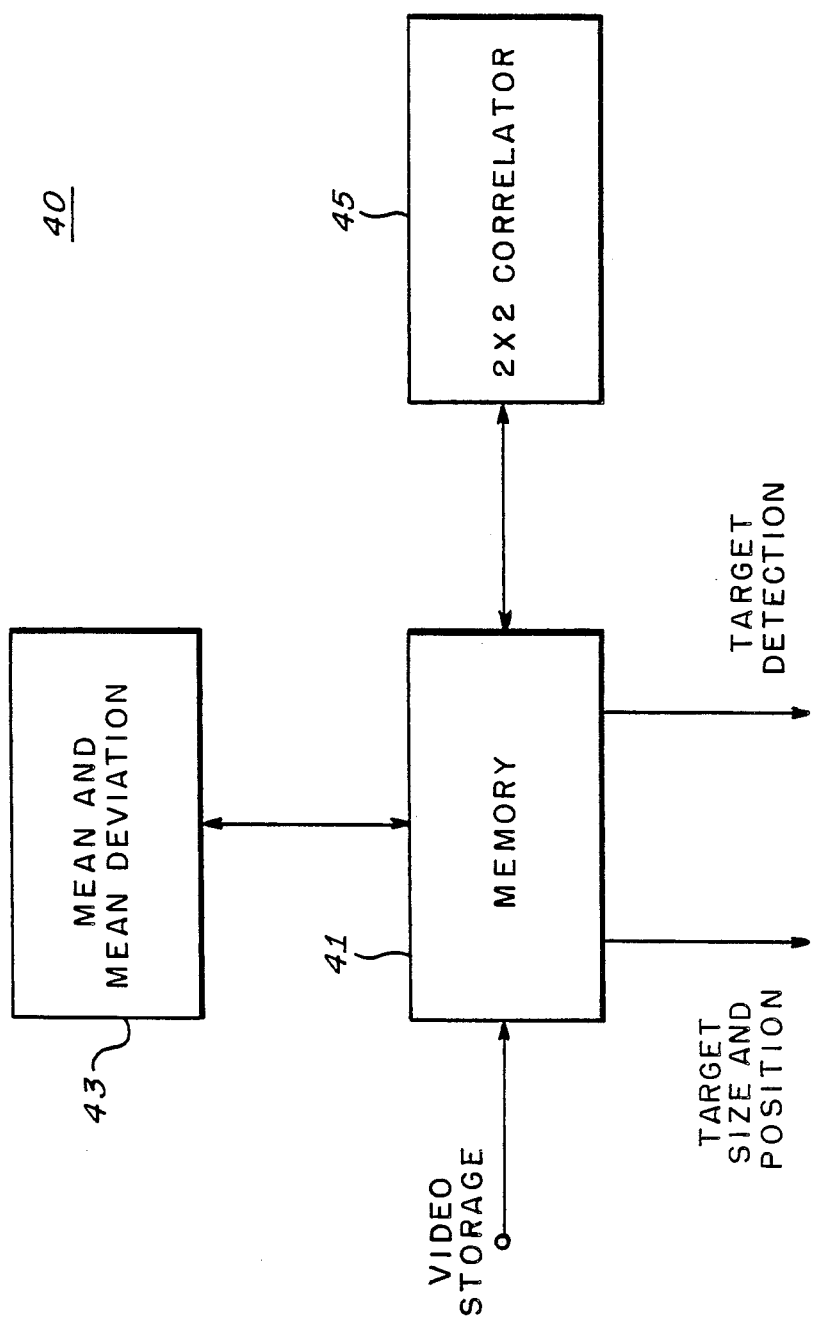
FIG. 3 is a block diagram of the noise reduction unit of FIG. 1.

Referring now to FIG. 3, data transferred to the tracking processor 12 is stored in a memory 41 in noise reduction element 40. Mean and mean deviation unit 43 reads this data for each window and starts the noise reduction process by computing the mean and mean deviation of the values stored in the first and last rows ($Y_1$, $Y_{16}$) of the window. The mean is determined by summing the values in each cell and dividing the result by the number of cells. Mean deviation is then determined by subtracting the mean from the value in each cell in the row, summing the absolute values of the differences and dividing by the number of cells. The mean value plus a scale factor times the mean deviation in the row providing the smaller values of mean and mean deviation are then subtracted from the values in all the cells of the window. The scale factor multiplier is selected by the operator in accordance with his assessment of the extent of background clutter. This provides a clutter reduction that is based on the actual background clutter.

Further noise reduction is accomplished by a 2 out of 2 correlation processor 45, in the tracking processor 12, which checks the amplitude in the cells to the right and left of each cell having a positive amplitude after the initial noise reduction. If at least one of the cells abutting the central cell does not have a positive amplitude, the amplitude of the central cell is set to zero. Thus, there must be at least two adjacent cells with positive values to establish the presence of a target. Since each cell covers an area that is smaller than the anticipated target size, a target detection must appear in two or more abutting cells. Consequently, detections in isolated cells are due to noise or clutter. This correlation process removes all stored cell values in the window that do not correlate in azimuth with one of its neighbors. It should be recognized that a similar correlation may be performed along the range axis.

Figure 4:
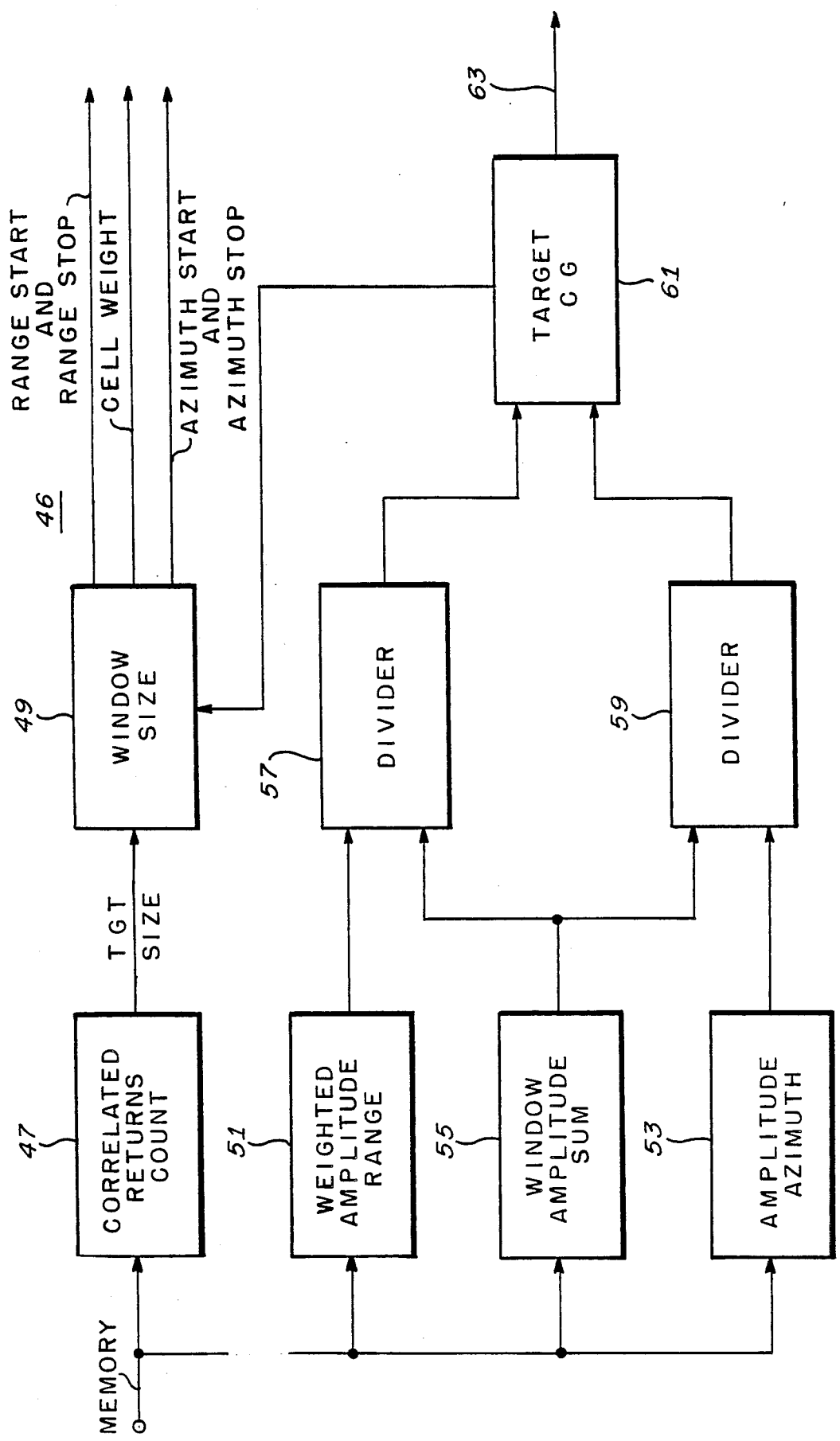
FIG. 4 is a block diagram of the target size and position unit of FIG. 1.

Referring again to FIG. 2, following the correlation process, the window is searched by target detection processor 44 to determine the existence of a target. A target detection is verified by the target detection processor 44 when the number of correlated returns in the window exceeds a preestablished value. If a target is detected in a cell, the cell data is coupled to target size and position processor 46 to establish the target size and position in that cell. Referring to FIG. 4, target size and position processor 46 includes a correlated returns counter 47 which determines the target size by counting the number of correlated returns in the window. Since each cell is of known range and azimuth dimensions this count provides the size of the target. After the target size has been determined, the size data is coupled to a window size processor 49, yet to be described.

Continue reference to FIG. 4, the range and azimuth positions of a target in the window are determined by summing the amplitude in all cells of a range row and summing the amplitudes of all cells in an azimuth column, weighting the range row sums by the range row position and summing to obtain a range row weighted sum, weighting the azimuth column sums by the azimuth column position to obtain a column weighted sum, and dividing the range row and azimuth column weighted sums by the sum of the amplitudes in all the cells of the window. The range row weighted sum (my), azimuth column weighted sum $(mx)_F$, and the sum of amplitudes $n_F$ within the window are calculated by a range weighted amplitude processor 51, an azimuth weighted amplitude processor 53, and a window amplitude sum processor 55, respectively. The sum output of window amplitude sum processor 55 is coupled to dividers 57 and 59, while the sum outputs of range weighted amplitude processor 51 and azimuth weighted processor 53 are respectively coupled to dividers 57 and 59, wherefrom the target range $(my)_F/n_F$ and azimuth $(mx)_F/n_F$ positions in the cell are respectively provided.

All the sums $n_F$, $(my)_F$, and $(mx)_F$ are accumulated by adding the value for a cell, range row, and azimuth column to the value accumulated from the addition of values from previous cells, range rows, and azimuth columns. Devoting the accumulated sums prior to the kth addition by the subscript k−1, the sums after the kth addition for the sum of the amplitudes in all the cells n, the azimuth column weighted sum mx, and the range row weighted sum my are:

$$n_k = n_{k-1} + a_k$$

$$(my)_k = (my)_{k-1} + J_k \cdot a_{Jk}$$

$$(mx)_k = (mx)_{k-1} + I_k a_{Ik}$$

where:
$a_k$ is the amplitude in the kth added cell
$J_k$ is the kth row position
$a_{Jk}$ is the sum of the amplitudes in row $J_k$ for the kth sum
$I_k$ is the kth column position
$a_{Ik}$ is the sum of the amplitudes in column $I_k$ for the kth sum The target position $(my)_F/n_F$, $(mx)_F/n_F$ is coupled to a target center of gravity processor 61 which offsets the range and azimuth positions by one half cell width in both dimension, to position the target center of gravity at the center of a cell, and adds the rsults to the range start R and the azimuth start $A_s$ to obtain a range center of gravity $R_{cg}$ and an azimuth center of gravity $A_{cg}$ which are represented by:

$$R_{cg} = R_s + [(my)F/NF + 0.5]$$

$$A_{cg} = A_s + [(mx)_F/n_F + 0.5]$$

This target position within the window is coupled to the window size processor 49, to which the target size data is also coupled.

After the target size and center of gravity in the window has been determined, window size processor 49 adjusts the window so that the target covers between 25 and 75 percent of the window in the range dimension and positions the window along the range axis so that a predetermined number of empty range bins, which may be no less than 4, are between the target and both range start and range stop. Window size processor 49 also positions the window in azimuth to establish no less than 2 azimuth sectors on either side of the target.

Once the target is substantially centered, window size processor 49 assigns a weight to each cell in the window that is to be applied to the amplitude of a detection in the cell on the subsequent sweep for that target. The assigned weighting is unity for cells in the target area and a factor less than unity for cells at and near the window borders. Since detections in the cells away from the target are given less weight than detections in the target area, a second target entering the window appears less prominent than it actually is, consequently a significant reduction in the probability of target swapping is achieved.

With the determination of the target center of gravity complete, target position data is coupled, via line 63, from the target cg processor 61 to a speed and heading processor 52 wherein target speed and heading is computed by subtracting the previous computed position from the present computed position and dividing by the antenna scan time. Since the window starts must be established before the next update scan, speed and heading processor 52 couples speed and heading representative signals to a target position estimator 65. The target position estimator comprises an alpha-beta filter and utilizes these signals to predict the target location at the time for the next update scan and provides signals representative of the predicted location to the tracking processor 12.

Polar coordinate data of the present target position received by the speed and heading processor 52 is converted to rectangular coordinates and channeled for separate X and Y processing. Speed and heading processor 52 subtracts the previous measured target coordinate position from the present measured target coordinate position and divides by the antenna scan time to establish measured coordinate velocities Vx and Vy. The present measured coordinate positions, the present coordinate velocities and the previous predicted coordinate position and predicted coordinate velocities are utilized in the alpha-beta filter in the target position estimator 65 to establish a predicted target position and a predicted target velocity for the next antenna scan in the following manner:

$$v_{x2} = v_{x1} + \beta(x - x_1) f_c/t_s$$

$$x_2 = x_1 + \alpha(x - x_1) f_c + (v_{x1} - v) t_s$$

x = present position (x being representative of both x and y coordinates, since the same equations govern the predicted position and velocity for both)
$x_1$ = past predicted position
$x_2$ = present predicted position
$v_{x1}$ = past predicted velocity
$v_{x2}$ = present predicted velocity
$t_s$ = antenna scan time
$f_c$ is a factor that is a function of the number of antenna scans since the last measurement (this factor permits the target position to be dead reckoned from the last measured velocity)

$$\beta = 1/(f_{sc}f_c)^2$$

$f_{sc}$ = filter scan count
$\alpha = \sqrt{2\beta}$

Should the predicted target position differ from the actual position on a number of successive update scans, the filter time constants are altered to achieve faster updates. When the actual target position is once again within a predetermined tolerance of the predicted target position, the filter time constants are returned to their original values.

Target position estimator 65 provides signals representative of positions of tracked targets. These signals may be coupled to a display unit for display and to other systems for further processing.

While the invention has been described in its preferred embodiment, it is to be understood that the words which have been used are words of description rather than limitation and that changes or alterations may be made within the purview of the appended claims without departing from the true scope and spirit of the invention in its broader aspects.

We claim:

1. An apparatus for detecting radar return video signals comprising:
    means for receiving said video signals within predetermined range bins and angle sectors for providing signals representative of average amplitudes of a plurality of successive radar returns within cells of a matrix of cells formed by said range bins and said angle sectors, each range bin forming a row in said matrix and each angle sector forming a column;
    means for storing said representative signals in memory units corresponding to said cells, thereby establishing memory stored signals;
    means responsive to said memory stored signals for computing a mean value and a mean deviation value for said representative signals in at least one row of said matrix;
    means coupled to said computing means and said memory means for subtracting a linear combination of said mean value and said mean deviation value from said memory stored signals, thereby establishing noise reduced signals; and
    means responsive to said noise reduced signals for setting positive noise reduced signals to zero in cells not having at least one abutting cell with a positive noise reduced signal, abutting cells with positive noise reduced signals therein representing detected target units.

2. An apparatus for detecting radar return video signals in accordance with claim 1 further including means for establishing at least one detection window, each window commencing in range and angle at selected positions, extending in range for a plurality (m) range bins and extending angularly for a multiplicity (n) angle sectors, thereby establishing windows with m×n cells therein.

3. An apparatus for detecting radar return video signals in accordance with claim 2 further including:
    means for counting said detected target units in each window to provide a signal representative of a target size therein;
    means for weighting said detected target units in accordance with row positions to obtain a row weighted signal for each row;
    means for weighting said detected target units in accordance with column positions to obtain a column weighted signal for each column;
    means for summing said row weighted signals, said column weighted signals, and signals in all cells to obtain a signal representative of a row weighted sum, a signal representative of a column weighted sum, and a signal representative of a total signal sum, respectively, for each window; and
    means responsive to said signals representative of said row and column weighted sums and said signal representative of said total signal sum for dividing said signals representative of said row and column weighted sums by said signal representative of said total signal sum to obtain a signal representative of target position in each window.

4. An apparatus for detecting radar return video signals in accordance with claim 3 further including means responsive to said signal representative of said target size and said signals representative of said row and target position for adjusting each window size in accordance with said target size therein, thereby providing adjusted windows, and for centering targets within said adjusted windows.

5. An apparatus for detecting radar return video signals in accordance with claim 4 wherein said return video signals are detected by a radar system having a scanning antenna and means for determining angular locations of said targets in said windows relative to a predetermined angular reference further including:
    means for determining speeds and headings of moving targets in said windows and providing signals representative thereof; and
    means responsive to said speed and heading representative signals for providing predicted positions of said targets for subsequent antenna scans.

6. A method for detecting radar return video signals including the steps of:
    receiving said video signals within predetermined range bins and angle sectors, said range bins and angle sectors forming cells in a range-angle matrix of cells;
    averaging signal amplitudes of successive radar returns for each cell, to provide signals representative of average amplitudes in each cell;
    storing said representative signals in memory units corresponding to said cells, thereby establishing memory stored signals;
    computing a mean value and a mean deviation value for said representative signals in at least one row of said matrix in response to said memory stored signals;
    subtracting a linear combination of said mean value and mean deviation value from said memory stored signals, thereby establishing noise reduced signals; and
    setting positive noise reduced signals to zero in cells not having at least one abutting cell with a positive noise reduced signal, abutting cells with positive noise reduced signal, abutting cells with positive noise reduced signals therein representing detected target units.

7. A method for detecting radar return video signals in accordance with claim 6 further including the step of establishing at least one detection window, each window commencing in range and angle at selected positions, extending in range for a plurality (m) range bins and extending angularly (n) for a multiplicity (n) angle sectors, thereby establishing m×n cells in a window.

8. A method for detecting radar return video signals in accordance with claim 7 further including the steps of:
- counting said target units in each window to provide a signal for each window representative of a target size therein;
- weighting said detected target units in accordance with row positions in said window to obtain a row weighted signal for each row;
- weighting said detected target units in accordance with column positions in said windows to obtain a column weighted signal for each column;
- summing said row weighted signals, said column weighted signals, and signals in all cells in each window to obtain a signal representative of a row weighted sum, a signal representative of a column weighted sum, and a signal representative of a total signal sum, respectively, for each window; and
- dividing said row and column weighted sums of a window by said signal representative of said total sum to obtain a signal representative of target position in each window.

9. The method of claim 8 further including the steps of:
- adjusting each window size in accordance with a target size therein thereby providing adjusted windows; and
- centering targets within said adjusted windows.

10. The method of claim 9 further including the steps of:
- determining speeds and headings of moving targets in said windows; and
- calculating predicted positions of said targets at a subsequent time.

* * * * *